(12) United States Patent
Gäbele

(10) Patent No.: US 12,528,093 B2
(45) Date of Patent: Jan. 20, 2026

(54) METHOD FOR INTRODUCING COLD FOAM INTO A SHOWER CUBICLE, A VAPOR BATH OR ANOTHER SANITARY FACILITY SUITED FOR THIS, AND DEVICE FOR SUCH A METHOD

(71) Applicant: Klafs GmbH, Schwäbisch Hall (DE)

(72) Inventor: Markus Gäbele, Schwäbisch Hall-Gailenkirchen (DE)

(73) Assignee: Klafs GmbH, Schwabisch Hall (DE)

( * ) Notice: Subject to any disclaimer, the term of this patent is extended or adjusted under 35 U.S.C. 154(b) by 767 days.

(21) Appl. No.: 17/590,911

(22) Filed: Feb. 2, 2022

(65) Prior Publication Data

US 2022/0241805 A1 Aug. 4, 2022

(30) Foreign Application Priority Data

Feb. 3, 2021 (EP) .................................. 21154972

(51) Int. Cl.
  *B05B 7/00* (2006.01)
  *B05B 7/04* (2006.01)
  *B05B 7/16* (2006.01)

(52) U.S. Cl.
  CPC .......... *B05B 7/0018* (2013.01); *B05B 7/0483* (2013.01); *B05B 7/1606* (2013.01)

(58) Field of Classification Search
  CPC .... B05B 7/0018; B05B 7/0483; B05B 7/1606
  USPC ....................................... 261/122.1, DIG. 26
  See application file for complete search history.

(56) References Cited

U.S. PATENT DOCUMENTS

| 1,922,749 | A | * | 8/1933 | Roush | A47J 43/125 |
| | | | | | 261/122.1 |
| 2,318,826 | A | | 5/1943 | Willis et al. | |
| 3,488,287 | A | * | 1/1970 | Seglin | C11D 3/0052 |
| | | | | | 424/47 |
| 4,004,302 | A | * | 1/1977 | Hori | A61H 33/02 |
| | | | | | 261/DIG. 26 |
| 6,772,455 | B2 | * | 8/2004 | Takahata | A61H 33/02 |
| | | | | | 261/DIG. 26 |

FOREIGN PATENT DOCUMENTS

| DE | 3039969 A1 | | 4/1982 |
| JP | 10-192177 A | * | 7/1998 |
| JP | 2002-336147 A | * | 11/2002 |

(Continued)

OTHER PUBLICATIONS

English Machine Translation of JP 10-192177 A (Year: 1998).*

(Continued)

*Primary Examiner* — Charles S Bushey
(74) *Attorney, Agent, or Firm* — Dickinson Wright PLLC

(57) ABSTRACT

The method includes the introduction of foam into a shower cubicle, a vapor bath, or another sanitary facility. The foam is introduced at a temperature of −15° C. to 20° C., preferably of 0° C. to 18° C., particularly preferred of 5° C. to 15° C., from a foam generator into the shower cubicle, the vapor bath, or the other sanitary facility. The foam preferably has the temperature at an outlet of the foam generator. Apart from that, the disclosure also relates to a device for such a method according to the disclosure and a shower cubicle or a vapor bath having such a device.

10 Claims, 3 Drawing Sheets

(56) References Cited

FOREIGN PATENT DOCUMENTS

| | | | | |
|---|---|---|---|---|
| JP | 2002-339420 | A | * | 11/2002 |
| JP | 2003-116730 | A | * | 4/2003 |
| JP | 2004-180862 | A | * | 7/2004 |
| JP | 5083596 | B2 | * | 11/2012 |
| RU | 2241204 | C2 | * | 11/2004 |
| WO | 2004040071 | A1 | | 5/2004 |

OTHER PUBLICATIONS

English Machine Translation of JP 2002-336147 A (Year: 2002).*
English Machine Translation of JP 2002-339420 A (Year: 2002).*
English Machine Translation of JP 2003-116730 A (Year: 2003).*
English Machine Translation of JP 2004-180862 A (Year: 2004).*
English Machine Translation of RU 2241204 C2 (Year: 2004).*
English Machine Translation of JP 5083596 B2 (Year: 2012).*

* cited by examiner

METHOD FOR INTRODUCING COLD FOAM INTO A SHOWER CUBICLE, A VAPOR BATH OR ANOTHER SANITARY FACILITY SUITED FOR THIS, AND DEVICE FOR SUCH A METHOD

CROSS-REFERENCE TO RELATED APPLICATION

This application claims priority to and the benefit of European Application Serial No. 21154972.0, filed on Feb. 3, 2021 entitled "METHOD FOR INTRODUCING COLD FOAM INTO A SHOWER CUBICLE, A VAPOR BATH OR ANOTHER SANITARY FACILITY SUITED FOR THIS, AND DEVICE FOR SUCH A METHOD", the contents of which are herein incorporated by reference.

BACKGROUND

1. Field

The present field relates to a method for introducing foam into a shower cubicle, a vapor bath, or another sanitary facility suited for this. Other sanitary facilities suited for this are characterized in that the introduction of foam is permitted due to the materials used. For example, wash-basins, basins for foot baths and plunge pools are such suited sanitary facilities.

2. Related Art

To be able to stand out from competitive products, in the wellness and hygienic field, there is a demand for methods which offer the users particularly enjoyable and extraordinary wellness and bathing experiences differing from already known wellness experiences.

SUMMARY

It is the object of the present disclosure to indicate such a method.

Accordingly, the object is achieved according to the disclosure if the foam is introduced at a temperature of −15° C. to 20° C. from a foam generator into the shower cubicle, the vapor bath, or the other sanitary facility suited for this. Preferably, the temperature of the foam is between 0° C. and 18° C. Particularly preferred, the temperature is between 5° C. and 15° C. Preferably, the foam has the temperature at an outlet of the foam generator.

The cold foam here offers a particular experience on the skin of the user of the shower cubicle, the vapor bath, or the other sanitary facility suited for this. Moreover, in this manner, a particularly enjoyable type of cooling is permitted since the cold foam has a very refreshing effect without cooling down the skin too quickly and painfully. The method according to the invention thus offers, among other things, a particular possibility of cooling after wellness treatments at an increased temperature. By the use of foam, the method is moreover resource-efficient with respect to the use of water.

Preferably, the foam is introduced into the shower cubicle or the vapor bath. This permits an application of the foam on the whole body which additionally improves the wellness experience.

Advantageous embodiments of the present disclosure are the subject matter of the sub-claims.

According to a preferred embodiment of the method according to the disclosure, the foam is produced in the foam generator by blowing air into a mixture of liquid water at a temperature of −18° C. to 18° C. and soap, and the foam produced thereby exits the foam generator through the outlet, wherein the freezing point of the liquid water, when the temperature of the water is to be below 0° C., is correspondingly lowered by admixing a component that lowers the freezing point. The foam production on the basis of cold water has the advantage that the foam temperature is directly within the desired range and no subsequent cooling of the foam has to be effected before the introduction into the respective sanitary facility. The method thereby becomes more energy-efficient, and procedure steps can thus be omitted. Moreover, the air preferably does not have to be cooled. Thus, a difference between the foam temperature at the outlet of the foam generator and the water temperature in the foam generator of 1° C. to 5° C. often results. Preferably, no component that lowers the freezing point is admixed if only foam at foam temperatures above 0° C. is introduced.

In a particularly preferred method, the air exits from a bubble plate at the bottom of the foam generator. By the use of a bubble plate, air can be blown into the foam generator in an inexpensive and efficient way. By a suited selection with respect to the hole size, hole geometry and arrangement of the holes, the bubble size and the general consistency of the foam can be influenced. Preferably, the air supply is effected via a fan. Also preferably, the fan sucks in air from outside the shower cubicle, the vapor bath, or the other sanitary facility suited for this. It is thereby prevented that the fan sucks in humid air which could possibly damage the fan.

According to a further preferred method, the liquid water is supplied to the foam generator via an inlet, wherein the soap is either supplied via an additional soap inlet or is admixed to the liquid water before it enters the foam generator. Such an inlet facilitates the supply of the foam generator with liquid water. Preferably, the inlet is fitted with a control valve, so that the supply and the supplied amount can be controlled.

In a particularly preferred method, a surface level of the mixture of liquid water and soap is controlled by a controlled supply of liquid water and soap. It can here be ensured that there is always sufficient liquid water or mixture of liquid water and soap in the foam generator, and the foam generation can thus be effected consistently and at suited conditions. Such a control of the surface level can be based on various measuring devices. Preferably, the supply can be controlled via the position of a float. Equally, sensors can be utilized for determining the surface level. Such sensors can be based, among other things, on light signals or electric conductivity changes.

According to a further preferred embodiment of the method according to the disclosure, the supply of the liquid water into the foam generator is fed from a cold water reservoir, wherein the cold water reservoir includes a cooling that sets the water temperature. By the use of a cold water reservoir, a sufficient amount of liquid water can be stored at the desired temperature. Preferably, the cold water reservoir is designed such that the one-time volume of the cold water reservoir includes water for sufficient foam for an application of the method. Thus, foam can be produced at the set temperature without delay. By a suited dimensioning of the cold water reservoir, the cooling can moreover be designed particularly efficiently. Further preferably, the cold water reservoir is connected to a cold water supply point. Thus, the cold water reservoir can be refilled.

In another preferred embodiment, the supply of the liquid water into the foam generator is fed from a through-flow cooler that is connected to a cold water supply point. Here, no reservoir is required which, among other things, saves space.

In a preferred embodiment of the method, the foam generator includes a temperature sensor which is arranged such that the temperature sensor is seated in the mixture of water and soap. Thereby, the cooling in the cold water reservoir can be adapted to achieve the desired temperature of the water also in the foam generator.

Advantageously, the component that lowers the freezing point is admixed to the liquid water upstream of or in the cold water reservoir when the water temperature in the cold water reservoir is set to below 0° C. The water temperature upstream of the cold water reservoir can correspondingly be above 0° C. In order to prevent changes of the state of aggregation of the water in the cold water reservoir, however, the component that lowers the freezing point must be present in the cold water reservoir since there, the temperature of the water is set to below 0° C.

In a particularly advantageous embodiment of the method, a disinfectant, preferably hydrogen peroxide, and/or a scent is added to the water upstream of the foam generator. By the addition of a disinfectant, hygiene standards can be met. By the addition of scents, the wellness experience can be further improved. By adding various scents, the method can moreover be personalized.

Preferably, the disinfectant and/or the scent is added downstream of the cold water reservoir. Thus, the disinfectant and/or the scent cannot deposit in the cold water reservoir which would result in an increased cleaning frequency of the cold water reservoir.

The present invention also provides a device for introducing foam into a shower cubicle or a vapor bath for carrying out the method according to the invention, in particular in one of the above-described embodiments.

Apart from that, the invention provides a shower cubicle with a device according to the invention. Moreover, the invention provides a vapor bath cubicle with a device according to the invention.

Additionally, the disclosure provides a device for producing foam, preferably for introducing foam into a shower cubicle, a vapor bath, or another sanitary facility suited for this, in particular for carrying out the method according to the invention, in particular in one of the above-described embodiments, with a foam generator for supplying air into a mixture of water and soap, wherein the device includes a cold water supply for providing water at a temperature between −18° C. and 20° C., and a warm water supply for providing water at a temperature between 30° C. and 60° C., wherein a control valve that controls the temperature as a conventional mixer faucet couples the cold water supply and the warm water supply upstream of the foam generator. With such a device, the user of the shower cubicle, the vapor bath, or the other sanitary facility suited for this can adapt the foam temperature according to his/her demands. It is thus possible to supply cold foam, tepid foam and also hot foam. Preferably, the control valve can control the temperature of the mixture of water and soap in the foam generator also such that in each case water is supplied only either from the cold water reservoir or the warm water reservoir, and the temperature is set by the mixing in the foam generator.

Preferably, the foam generator includes a temperature sensor which is arranged such that the temperature sensor is located within the mixture of water and soap. With the temperature sensor, the control valve can be readjusted to reach the desired exact temperature of the water in the foam generator.

Also preferably, the foam generator includes a surface level measuring device for the mixture of water and soap in the foam generator. Via this measuring device, the surface level of the mixture can be set via the control valve.

In a particularly preferred embodiment of the device, a control of the control valve is set such that measuring data of the temperature sensor and the surface level measuring device are used for setting the temperature of the mixture in the foam generator.

In a particularly preferred embodiment of the device, the control valve includes, in addition to the supply point of the cold water supply and the warm water supply, a supply point for admixing soap. By the addition at the control valve, it is ensured that there is no soap in the cold water supply or the warm water supply and could deposit there when this water supply is not being used.

In a further preferred embodiment of the device, the foam generator includes a drain with a control system permitting a quick draining of the foam generator and a subsequent filling with a mixture of water and soap at a different temperature. Thus, the foam temperature the user of the device desires can be reached more quickly In an also preferred embodiment of the device, the drain is connected to a mixed water reservoir, wherein the mixed water reservoir is connected to the control valve such that the mixture of water and soap can be supplied from the mixed water reservoir again to the foam generator. This permits a particularly resource-efficient handling of the mixture of water and soap since the mixture, which is discharged from the foam generator due to a desired temperature change of the foam, can be reused. Preferably, the mixed water reservoir also has a temperature sensor and a surface level measuring device. Thereby, the control of the control valve can supply the mixture in the mixed water reservoir to the foam generator for setting the temperature of the mixture in the foam generator. Equally preferably, the mixed water reservoir can include a heating and/or a cooling for setting the temperature of the mixture in the mixed water reservoir.

In a further preferred embodiment, the device includes a second cold water reservoir with a second cooling. Preferably, the second cold water reservoir and its cooling are set such that water is held available at a temperature above 0° C., the cold water reservoir then holding water available at a temperature below 0° C. Thereby, the device becomes more energy efficient, since only a smaller proportion of the water has to be held available for a special application with a temperature range below 0° C.

BRIEF DESCRIPTION OF THE DRAWINGS

Embodiments of the disclosure will be illustrated more in detail below with reference to drawings.

In the drawing.

DETAILED DESCRIPTION

Figure 1:
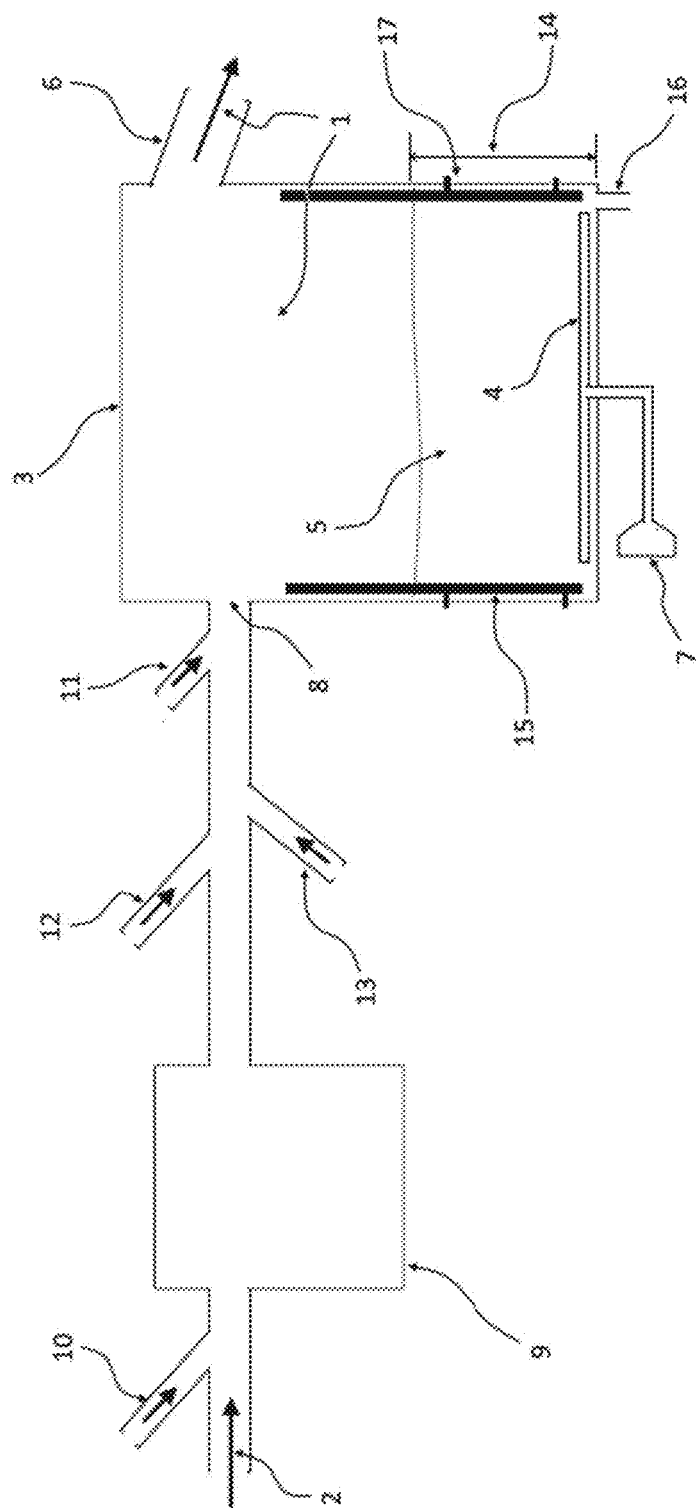
FIG. 1 shows a schematic representation of a first device according to the invention with a cold water supply point for introducing foam into a shower cubicle, a vapor bath, or another sanitary facility suited for this.

In the following illustrations, equal parts are designated by equal reference numerals. If a figure contains reference numerals which are not discussed in greater detail in the pertaining description of the figures, reference is made to preceding or following descriptions of the figures.

FIG. 1 shows a schematic representation of a first embodiment of a device according to the invention for carrying out the method according to the invention with a cold water supply point 2.

FIG. 1 shows a foam generator 3 in which foam 1 is produced for introducing it into a shower cubicle, a vapor bath, or another sanitary facility suited for this. The foam 1 in the foam generator 3 is produced by blowing air from a bubble plate 4 into a mixture 5 of water and soap. The foam 1 produced thereby exits from the foam generator 3 into the shower cubicle, the vapor bath, or the other sanitary facility suited for this through an outlet 6. The air supply to the bubble plate 4 is effected via a fan 7. The air supply to the fan 7 here is located outside the shower cubicle, the vapor bath, or the other sanitary facility suited for this. Thereby, no humid air reaches the fan 7 which could possibly damage the same.

According to the method according to the invention, the foam 1 which is introduced into the shower cubicle, the vapor bath, or the other sanitary facility suited for this has a temperature of −5° C. to 20° C. To reach these foam temperatures, the mixture 5 of water and soap must be within the same temperature range or optionally slightly below this temperature range. To provide the foam generator 3 with the mixture 5, the foam generator 3 has an inlet 8. The inlet 8 is connected to a cold water reservoir 9 which is fed from a cold water supply point 2. To set the temperature of the mixture 5, the cold water reservoir 9 has a cooling means which brings the water from the cold water supply point 2 to the desired or required temperature. As, among other things, foam 1 with negative temperatures is to be produced, it must be possible to bring the liquid water to temperatures below 0° C. in the cold water reservoir 9. To this end, a component 10 that lowers the freezing point can be added to the water from the cold water supply point 2 upstream of the cold water reservoir 9. If no foam temperatures below 0° are to be reached, no addition of a component 10 that lowers the freezing point is required. A supply point to the connection between the cold water supply point 2 and the cold water reservoir 9 required for this is neither required.

Between the cold water reservoir 9 and the inlet 8 to the foam generator 3, soap 11 is admixed to the cooled water to produce the mixture 5 for generating foam in the foam generator 3. Here, an exact metering is required since the foam properties depend on the ratio between the cooled water and the soap 11.

Equally between the cold water reservoir 9 and the inlet 8 to the foam generator 3, a disinfectant 12 and/or a scent 13 can be moreover added. It is generally advantageous for additions, except for the component 10 that lowers the freezing point, to be added between the cold water reservoir 9 and the inlet 8 into the foam generator 3. Thus, no deposits of the additions can form in the cold water reservoir 9, which would lead to a required increased cleaning frequency of the cold water reservoir 9.

To make the foam production in the foam generator 3 as efficient and consistent as possible, the surface level 14 of the mixture 5 of water and soap is measured by means of a measuring device 15 to control the surface level 14 via this measurement by controlling the inflow of the mixture 5 of water and soap via the inlet 8.

The foam generator 3 moreover includes a temperature sensor 17 which is located in the mixture 5 of water and soap. Via the temperature sensor 17, the temperature of the mixture 5 in the foam generator 3 can be measured. Via this measurement, the cooling of the cold water reservoir 9 is readjusted to thus be able to set the desired foam temperature even more precisely.

The foam generator 3 moreover includes an outlet 16 by which the foam generator 3 can be drained. This can be done for cleaning the foam generator 3 or when the user terminates the use of the device of the first embodiment.

Figure 2:
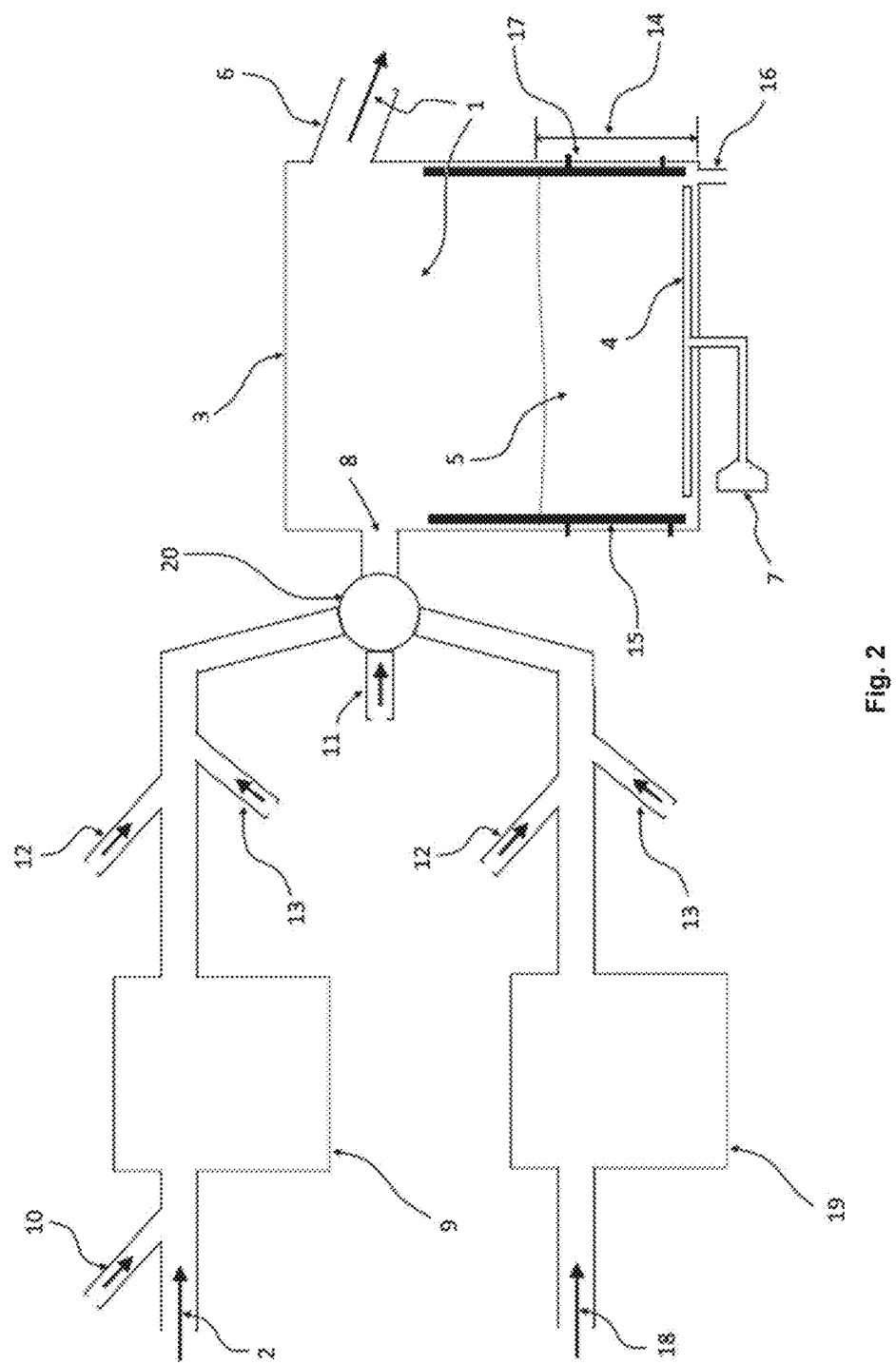
FIG. 2 shows a schematic representation of a second device according to the invention with a cold and warm water supply points for introducing foam into a shower cubicle, a vapor bath, or another sanitary facility suited for this.

FIG. 2 shows a schematic representation of a device according to a second embodiment for carrying out the method according to the invention with a cold water supply point 2 and a warm water supply point 18.

The device shown in FIG. 2 can here introduce foam 1 within a clearly broader temperature range into a shower cubicle, a vapor bath, or another sanitary facility suited for this. Here, the device is nevertheless able to carry out the method according to the invention for introducing foam 1 between −15° C. and 20° C.

The device of the second embodiment includes, as the device of the first embodiment shown in FIG. 1, a foam generator 3 in which air can be blown into a mixture 5 of water and soap via a bubble plate 4 to thus produce foam 1 which is introduced into the shower cubicle, the vapor bath, or the other sanitary facility suited for this from the foam generator 3 via an outlet 6. For the foam temperature to be within a broader temperature range, the device of the second embodiment additionally includes, apart from the cold water reservoir 9 with the corresponding cold water supply point 2 and the options for adding a component 10 that lowers the freezing point, a disinfectant 12 and/or scents 13, a warm water reservoir 19 which is fed from a warm water supply point 18. The water from the cold water reservoir 9 and the warm water reservoir 19 can be mixed into the foam generator 3 with a control valve 20 upstream of the inlet 8, so that the water temperature in the foam generator 3 can be within a broader temperature range. The warm water reservoir 19 can here includes a heating means to set the temperature in the warm water reservoir.

Here, the soap 11 is added directly at the control valve 20. Thus, soap has to be added only at one point, even if exclusively water from the cold water reservoir 9 or the warm water reservoir 19 is used. A disinfectant 12 and/or a scent 13 can also be added to the water from the warm water reservoir 19 between the warm water reservoir and the control valve 20. The soap 11, the disinfectant 12, and the scent can also be added downstream of the mixer faucet 20 and upstream of the inlet 8 in non-depicted embodiments.

The foam generator 3 of the device has the same control of the surface level 14 of the mixture 5 as the device shown in FIG. 1. Equally, the foam generator 3 of the device according to the second embodiment has a temperature sensor 17 which is seated in the mixture 5. Via the temperature sensor 17, on the one hand, the control valve 20 is readjusted to thus be able to better set the foam temperature. Moreover, via the temperature sensor 17, the cooling in the cold water reservoir 9 or the heating in the warm water reservoir 19, respectively, can also be readjusted. The control valve 20 can moreover include a control that connects measurements of the surface level and the temperature in the foam generator 3. Thus, in case of a desired foam temperature change, the current temperature and the current volume in the foam generator 3 can be determined to thus introduce the appropriate amount of the mixture of water and soap at the required temperature to obtain the desired temperature with the preferred surface level.

Moreover, the device of the second embodiment also includes an outlet 16 which is also used in this embodiment for discharging the mixture 5 of water and soap from the soap generator 3 if foam 1 with a clearly different temperature is to be produced. Thereby, the switching speed between an introduction of foam 1 at the upper end of the temperature range and an introduction of foam 1 at the lower end of the temperature range, and vice versa, can be realized swiftly and without long waiting times. The control of the outlet 16 is here also connected with the control of the control valve 20.

Figure 3:
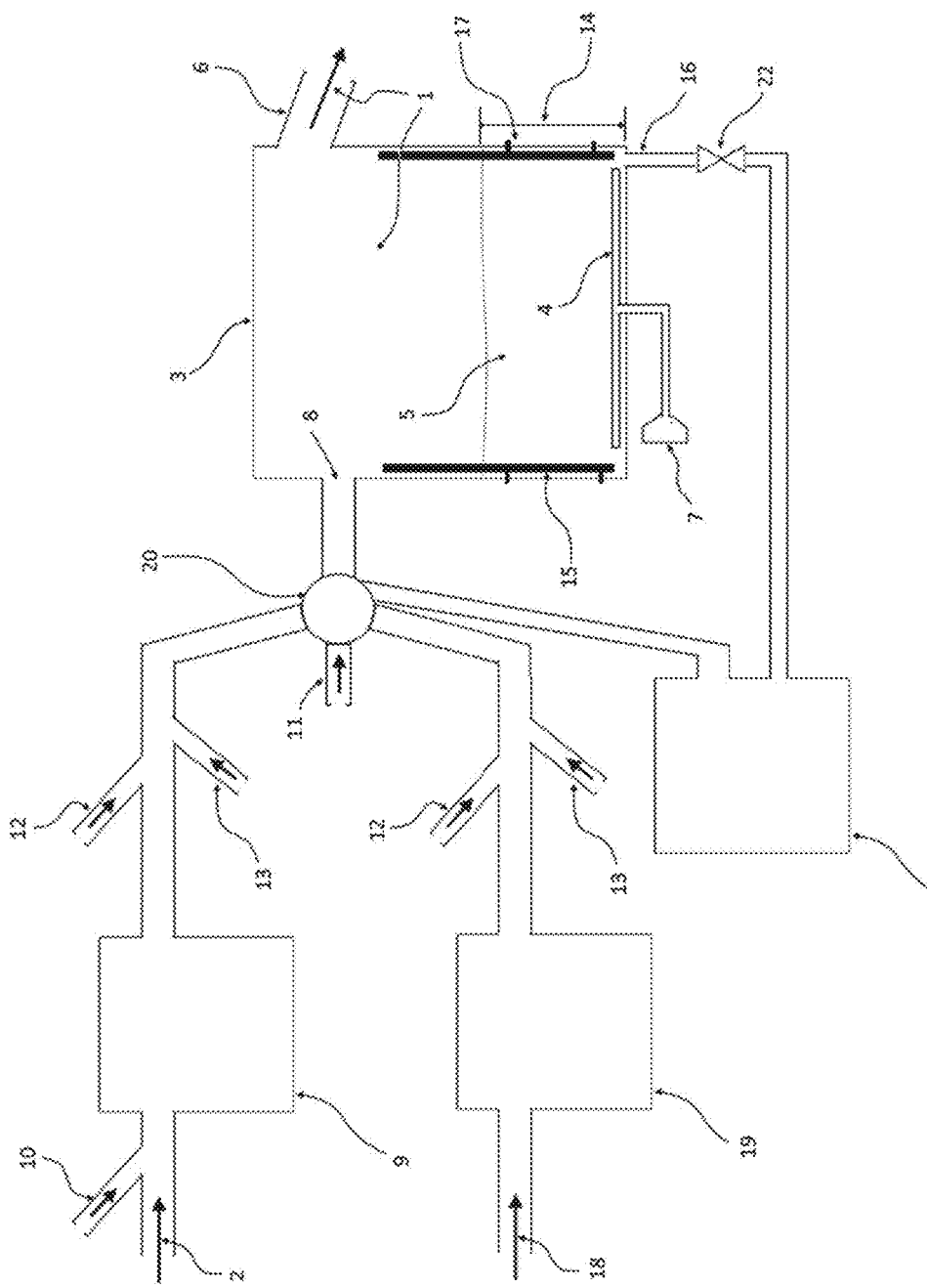
FIG. 3 shows a schematic representation of a third device according to the invention with a cold and warm water supply points and a mixed water reservoir for introducing foam into a shower cubicle, a vapor bath, or another sanitary facility suited for this.

FIG. 3 shows a schematic representation of a device according to a third embodiment for carrying out the method according to the invention with a cold water supply point 2 and a warm water supply point 18, and a mixed water reservoir 21.

The device shown in FIG. 3 can here introduce foam 1 within a temperature range corresponding to the temperature range of the second embodiment into a shower cubicle, a vapor bath, or another sanitary facility suited for this. Here, the device is still able to carry out the method according to the invention for introducing foam 1 between −15° C. and 20° C.

The device shown in FIG. 3 has the same components as the second embodiment, the device additionally including a mixed water reservoir 21 which is connected to the outlet 16 of the foam generator 3 via an outlet valve 22. The mixed water reservoir 21 is furthermore connected to the control valve 20.

With the device of the third embodiment, the mixture 5 can correspondingly be directed completely or partially via the outlet 16 and the outlet valve 22 into the mixed water reservoir 21 and from there directed again into the foam generator 3 via the control valve 20. Thereby, the mixture 5 in the foam generator 3 can be reused and the method becomes more resource-efficient. If the user of the device desires, for example, foam at a modified temperature, the mixture 5 at the temperature prevailing before can be directed into the mixed water reservoir 21 completely or partially, and the control valve 20 supplies water from the corresponding cold water reservoir 9, warm water reservoir 19, and mixed water reservoir 21 such that the desired foam temperature is set.

For this, the mixed water reservoir 21 also includes a temperature sensor and a surface level measuring unit so that the control of the control valve 20 by interaction with the drain valve 22 reaches the desired foam temperature as quickly as possible by changing the temperature of the mixture 5 in the foam generator 3.

What is claimed is:

1. A method for introducing foam into a shower cubicle, a vapor bath, or another sanitary facility, the method comprising the steps of:
    lowering a freezing point of liquid water to below 0° C. by admixing a component into the liquid water;
    supplying the liquid water from a cold water reservoir to an inlet of a foam generator, the cold water reservoir including a cooling means that sets the liquid water at a temperature that is below 0° C.,
    supplying soap via a soap inlet and admixing the soap to the liquid water before entering the foam generator,
    producing foam by blowing air into a mixture of soap and liquid water at a temperature of −18° C. to below 0° C., and
    introducing the foam into the shower cubicle, the vapor bath, or the other sanitary facility through an outlet of the foam generator, wherein the foam has a temperature of −15° C. to 20° C. at the outlet.

2. The method according to claim 1, further comprising the step of:
    supplying the air via a fan to exit from a bubble plate at the bottom of the foam generator.

3. The method according to claim 1, further comprising the step of:
    controlling a surface level of the mixture of liquid water and soap in the foam generator by a controlled supply of liquid water and soap.

4. The method according to claim 1, further comprising the step of:
    adding at least one of a disinfectant and a scent to the liquid water downstream of the cold water reservoir and upstream of the foam generator.

5. The method according to claim 4, wherein the disinfectant comprises hydrogen peroxide.

6. A method of introducing foam into a sanitary facility, the method comprising:
    lowering a freezing point of liquid water to below 0° C. by admixing a component into the liquid water;
    cooling the liquid water in a cold water reservoir with a cooling means that sets the liquid water at a temperature that is below 0° C.;
    supplying the liquid water from the cold water reservoir and soap to an inlet of a foam generator,
    producing foam by blowing air through a bubble plate disposed within the foam generator into a mixture of the soap and the liquid water, the mixture of soap and liquid water being at a temperature of −18° C. to below 0° C., and
    introducing the foam into the sanitary facility through an outlet of the foam generator,
    wherein the temperature of the foam when introduced into the sanitary facility is between −15° C. and 20° C.

7. The method of claim 6, comprising:
    supplying warm water at a temperature between 30° C. and 60° C. to the inlet of the foam generator, and
    controlling a temperature of the water supplied to the inlet of the foam generator via a control valve coupled to the cold water supply and the warm water supply.

8. The method of claim 6, wherein at least one of a disinfectant and a scent is added to the supplied water before entering the inlet of the foam generator.

9. A method of introducing foam into a sanitary facility, the method comprising:
    lowering a freezing point of liquid water in a cold water supply to below 0° C. by admixing a component into the liquid water,
    cooling a temperature of the liquid water in the cold water supply to below 0° C.,
    providing cold water at a temperature that is below 0° C. from the cold water supply to an inlet of the foam generator,
    providing warm water at a temperature between 30° C. and 60° C. from a warm water supply to the inlet of the foam generator, controlling a temperature of the water supplied to the inlet of the foam generator via a control valve coupled to the cold water supply and the warm water supply such that the temperature of the liquid water in the foam generator is in the range of −18° C. to below 0° C., supplying air into a mixture of soap and the water that has a temperature in the range of −18° C. to below 0° C. in the foam generator to generate foam, and introducing the foam into the sanitary facility through an outlet of the foam generator.

10. The method of claim 9, comprising the steps of:

draining the foam generator of the mixture of water and soap through a drain of the foam generator, the drain being connected to a mixed water reservoir, and supplying the foam generator with the mixture of water and soap from the mixed water reservoir through a control valve such that the mixture of water and soap is selectively supplied from the mixed water reservoir again to the foam generator.

* * * * *